United States Patent
Kelly

(10) Patent No.: US 7,296,174 B2
(45) Date of Patent: Nov. 13, 2007

(54) APPARATUS AND METHOD TO INTERFACE TWO DIFFERENT CLOCK DOMAINS

(75) Inventor: James D. Kelly, Scotts Valley, CA (US)

(73) Assignee: Broadcom Corporation, Irvine, CA (US)

( * ) Notice: Subject to any disclaimer, the term of this patent is extended or adjusted under 35 U.S.C. 154(b) by 380 days.

(21) Appl. No.: 10/822,534

(22) Filed: Apr. 12, 2004

(65) Prior Publication Data

US 2004/0193936 A1   Sep. 30, 2004

Related U.S. Application Data

(63) Continuation-in-part of application No. 10/269,913, filed on Oct. 11, 2002.

(60) Provisional application No. 60/511,024, filed on Oct. 14, 2003.

(51) Int. Cl.
*G06F 1/00* (2006.01)
*G06F 1/04* (2006.01)
*G06F 3/00* (2006.01)

(52) U.S. Cl. .................. 713/500; 713/600; 710/52

(58) Field of Classification Search ............... 713/500, 713/600, 400; 326/28; 710/52, 65
See application file for complete search history.

(56) References Cited

U.S. PATENT DOCUMENTS

| 6,345,328 | B1 * | 2/2002 | Rozario et al. | ............... 710/52 |
| 6,711,696 | B1 * | 3/2004 | Bates et al. | ............... 713/600 |
| 6,894,530 | B1 * | 5/2005 | Davidson et al. | ............. 326/38 |
| 7,100,065 | B2 * | 8/2006 | Adkisson | ..................... 713/400 |
| 2003/0188213 | A1 * | 10/2003 | Kark et al. | ................ 713/400 |
| 2004/0193931 | A1 * | 9/2004 | Akkerman et al. | ......... 713/400 |
| 2005/0055489 | A1 * | 3/2005 | Elliott | ........................ 710/310 |

* cited by examiner

*Primary Examiner*—Suresh K Suryawanshi
(74) *Attorney, Agent, or Firm*—Garlick Harrison & Markison

(57) ABSTRACT

A gearbox is placed between two clock domains to allow data to be transferred from one domain to the other. Although the two domains may operate at the same clock frequency, typically one domain has a faster clock speed than the other. The gearbox is disposed between the two clock domains to control timing of data transfer from one to the other, by selecting a pattern which identifies when data is made transparent for the transfer. The gearbox allows a number of clock ratios to be selected, so that a particular clock ratio between the two domains may be readily selected in the gearbox for the data transfer.

19 Claims, 12 Drawing Sheets fsLatchEn Generation for Clock Ratios Below 2:1

| Ratio[5:0] | Clock Ratio | Behavior |
| --- | --- | --- |
| 4 | 1.00:1 | fsLatchEn always asserted. |
| 5 | 1.25:1 | fsLatchEn asserted in all FCLKs except Phase 5. |
| 6 | 1.50:1 | fsLatchEn asserted in all FCLKs except Phases 3 and 6. |
| 7 | 1.75:1 | fsLatchEn asserted in Phases 2, 4, 6 and 7. |

FIG. 8 sfLatchEn Generation as a Function of Clock Ratio

| Clock Ratio | Behavior |
| --- | --- |
| 1.00:1 | Don't Care. Implemented as a 2.5 FCLK delay from fsLatchEn. |
| 1.25:1 | sfLatchEn is delayed 2.5 FCLKs from fsLatchEn. |
| 1.50:1 | sfLatchEn is delayed 2.5 FCLKs from fsLatchEn. |
| 1.75:1 | sfLatchEn is delayed 3.5 FCLKs from fsLatchEn. |
| 2.00:1 and up | sfLatchEn is delayed 0.5 FCLKs from fsLatchEn. |

FIG. 10 fsLatchEn Generation for Clock Ratios 2:1 and Above

| Ratio[5:0] | Clock Ratio | Behavior |
| --- | --- | --- |
| 8 | 2.00:1 | fsLatchEn asserts in a 2-2-2-2 pattern. That is, a repeating 1-0-1-0-1-0-1-0 pattern for a total of 9 FCLKs. |
| 9 | 2.25:1 | fsLatchEn asserts in a 3-2-2-2 pattern. That is, a repeating 1-0-0-1-0-1-0-1-0 pattern for a total of 9 FCLKs. |
| 10 | 2.50:1 | fsLatchEn asserts in a 3-2-3-2 pattern. |
| 11 | 2.75:1 | fsLatchEn asserts in a 3-3-3-2 pattern. |
| 12 | 3.00:1 | fsLatchEn asserts in a 3-3-3-3 pattern. |
| 13 | 3.25:1 | fsLatchEn asserts in a 4-3-3-3 pattern. |
| 14 | 3.50:1 | fsLatchEn asserts in a 4-3-4-3 pattern. |
| 15 | 3.75:1 | fsLatchEn asserts in a 4-4-4-3 pattern. |
| 16 | 4.00:1 | fsLatchEn asserts in a 4-4-4-4 pattern. |
| 17 | 4.25:1 | fsLatchEn asserts in a 5-4-4-4 pattern. |
| 18 | 4.50:1 | fsLatchEn asserts in a 5-4-5-4 pattern. |
| 19 | 4.75:1 | fsLatchEn asserts in a 5-5-5-4 pattern. |
| 20 | 5.00:1 | fsLatchEn asserts in a 5-5-5-5 pattern. |
| 21 | 5.25:1 | fsLatchEn asserts in a 6-5-5-5 pattern. |
| 22 | 5.50:1 | fsLatchEn asserts in a 6-5-6-5 pattern. |
| 23 | 5.75:1 | fsLatchEn asserts in a 6-6-6-5 pattern. |
| 24 | 6.00:1 | fsLatchEn asserts in a 6-6-6-6 pattern. |
| 25 | 6.25:1 | fsLatchEn asserts in a 7-6-6-6 pattern. |
| 26 | 6.50:1 | fsLatchEn asserts in a 7-6-7-6 pattern. |
| 27 | 6.75:1 | fsLatchEn asserts in a 7-7-7-6 pattern. |
| 28 | 7.00:1 | fsLatchEn asserts in a 7-7-7-7 pattern. |
| 29 | 7.25:1 | fsLatchEn asserts in a 8-7-7-7 pattern. |
| 30 | 7.50:1 | fsLatchEn asserts in a 8-7-8-7 pattern. |
| 31 | 7.75:1 | fsLatchEn asserts in a 8-8-8-7 pattern. |
| 32 | 8.00:1 | fsLatchEn asserts in a 8-8-8-8 pattern. |

APPARATUS AND METHOD TO INTERFACE TWO DIFFERENT CLOCK DOMAINS

CROSS REFERENCE TO RELATED APPLICATION

The present application is a continuation-in-part of and claims priority under 35 U.S.C. 120 to U.S. Utility Patent Application entitled MEMORY CONTROLLER CONFIGURABLE TO ALLOW BANDWIDTH/LATENCY TRADEOFF, having an application Ser. No. of 10/269,913, and a filing date of Oct. 11, 2002, which is incorporated by reference herein.

This application also claims the benefit of U. S. Provisional Patent Application entitled APPARATUS AND METHOD TO INTERFACE TWO DIFFERENT CLOCK DOMAINS, having an application Ser. No. of 60/511,024 and a filing date of Oct. 14, 2003, which is incorporated herein by reference.

BACKGROUND OF THE INVENTION

1. Technical Field of the Invention

The embodiments of the invention relate to timing circuits and, more particularly, to a timing interface module to interface two different clock domains.

2. Description of Related Art

Electronic devices may employ various communication technologies to communicate. Communication links may be physical media and/or wireless links. Various communication links are known to interface at a chip level, board level, network level or at a much larger system level. Examples of communication links include buses within a digital processing device, such as a computer. Such examples include PCI (peripheral component interface) bus, ISA (industry standard architecture) bus, USB (universal serial bus), as well as other connecting media. Communication technologies are typically based on certain communicating protocols, such as SPI (system packet interface) and hypertransport (HT) based technologies. HT was also previously known as lightning data transport (LDT). The HT standard sets forth definitions for a high-speed, low-latency protocol that may interface with today's buses, such as AGP, PCI, SPI, 1394, USB2.0, and 1 Gbit Ethernet, as well as next generation buses including AGP8x, infiniband, PCI-X, PCI 3.0, and 10 Gbit Ethernet. HT interconnects provide high-speed data links between coupled devices and most HT enabled devices include at least a pair of HT ports so that HT enabled devices may be daisy-chained. In an HT chain or fabric, a device may communicate with other coupled devices using appropriate addressing and control. Examples of devices that may be HT chained include packet data routers, server computers, data storage devices, and other computer peripheral devices. In today's networks and/or systems employing a communication link for data transfer, it is common to see HT and/or SPI (such as SPI-4) protocols being employed.

In order to facilitate data transfer between devices (or circuits within a device), proper timing control between the two devices/circuits is a factor for consideration. Whenever there are more than one clock domain involved for the data transfer, a timing relationship between the two clock domains may need to be addressed, whether the system is asynchronous, synchronous or pleseochronous, or a variant of one of these.

For example, within an integrated circuit (IC) chip, various clock domains may exist. The different clock domains either operate from different clock sources or operate from the same clock source, but have different clock frequencies. Thus, a processor, a bus, memory controller, and I/O interfaces within a chip may operate at different frequencies, whether the clock signals for those domains are sourced from the same clock source or from different clock sources. With advanced processing systems that are manufactured as a single IC, the various functional units of the IC may operate at different frequencies, even though the clocks for the separate domains originate from a central clocking source, such as a phase locked loop (PLL) clocking source.

Whenever there are two domains operating at two different clocking frequencies, the data transfer between the two domains occur with some adjustment for the difference in the frequency, in order for a valid data transfer from one domain to the other may be achieved. In these instances, one domain will be operating at a faster frequency than the second domain so that the data transfer from the faster clock domain to the slower clock domain (or from the slower clock domain to the faster clock domain) should ensure that the two domains compensate for the difference in the clock frequency, so that data is not lost.

Generally, for many devices the relationship of the clocking frequency between the various domains is an integer multiple. That is, in many instances there is a base clock frequency and the remaining clock signals that are generated for the other domains are an integral multiple of the base clock frequency. If the base frequency is divided, the divisor is typically limited to 2, so that the fractional clock frequency is ½ the base clock frequency. Where the frequency difference of the two clock domains is an integer multiple of one another, the timing adjustment is fairly simple to implement. However, when the timing difference has a ratio other than integer multiple or a division of 2, the timing difference imposes greater complexity. When other than simple ratios are implemented, such as a ratio of 5:4, specialized circuitry may be employed within each domain to adjust for the difference in the timing of the two domains. This specialized logic typically is ratio-specific to the particular ratio of the difference of the two clock frequencies.

Whenever there are a number of domains operating at different clock frequencies, separate ratio specific logic may be employed within each domain. A link between two domains of different clock frequencies generally uses ratio-specific logic at each end. Where there are a number of cross-domain data transfers in which the domains are operating at different clock frequencies, the number of such ratio-specific logic may add significant complexity and occupy more than an insubstantial real state on the chip. Furthermore, each pair of ratio-specific logic between clock domains may add further complexity to the design of circuitry for cross-domain data transfer.

Accordingly, it would be advantageous to have a more flexible interface to obtain effective data transfers between two domains having different clock frequencies.

SUMMARY OF THE INVENTION

An apparatus and method to interface two different clock domains. An interface unit, referred to as a gearbox is placed between the two clock domains to allow data to be transferred from one domain to the other. Although the two domains may operate at the same clock frequency, typically one domain has a faster clock speed than the other. The gearbox is disposed between the two clock domains to control timing of data transfer from one to the other. The gearbox allows a number of clock ratios to be selected, so that a particular clock ratio between the two domains may be readily selected in the gearbox for the data transfer.

In one embodiment, the gearbox allows for clock ratios of 1:1 to 8:1, in 0.25 increments, to be selected. The selected ratio allows data transfer in either or both directions by ignoring certain clock pulses of the faster time domain. Depending on the ratio of the two clock speeds, a particular pattern of asserting certain clock pulses is determined and used to identify when there is data transparency between the two domains to allow for the data transfer to occur.

In one embodiment, a state machine is used for ratios above 2:1 in which a hiccup state(s) is/are used along with a counter to generate the particular pattern for asserting the clock pulses for data transparency. The state machine uses the integer value of the clock ratio to determine the count for the counters and the fractional value to determine the number of hiccup states to be executed.

BRIEF DESCRIPTION OF THE SEVERAL VIEWS OF THE DRAWINGS

FIG. 8 is a table showing a generation of the fsLatchEn signal for clock ratios below 2:1.

FIG. 9 is a table showing a generation of the fsLatchEn signal for clock ratios of 2:1 and above.

FIG. 10 is a table showing a generation of the sfLatchEn signal as a function of the clock ratio.

FIG. 11 is a state diagram showing the operation of the state machine of FIG. 7.

DETAILED DESCRIPTION OF THE EMBODIMENTS OF THE INVENTION

The embodiments of the present invention may be practiced in a variety of settings that implement two different clock domains, whether the two clock domains exist on the same integrated circuit or exist in separate devices or systems. The examples below describe embodiments of the invention in which different clock domains are resident on an integrated circuit device. Furthermore, specific clock domains are noted in reference to a processor architecture. However, other embodiments may be employed in other architectures and devices.

Figure 1:
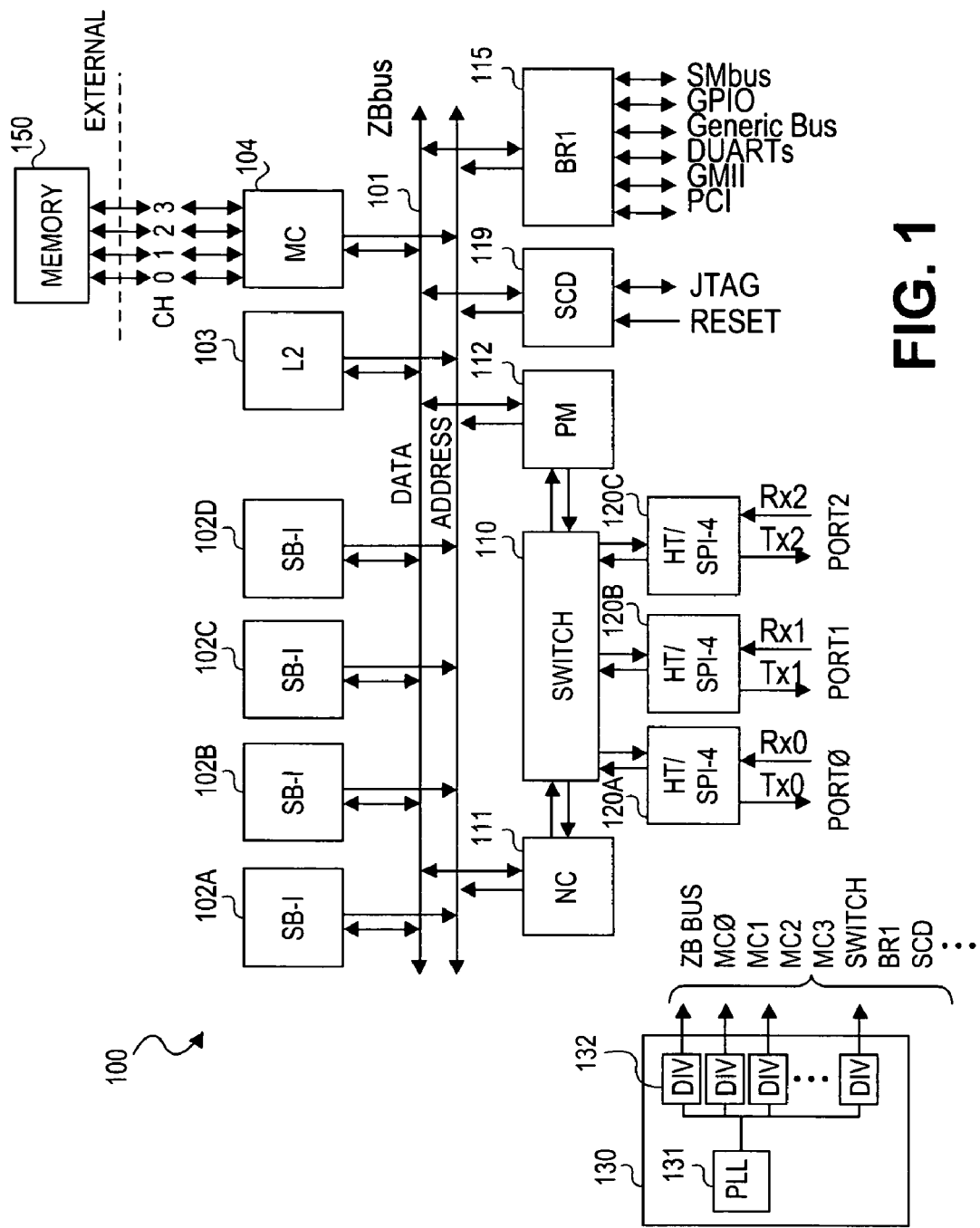
FIG. 1 is a block schematic diagram of an example embodiment of a system-on-a-chip that includes multiple processors, a bus, a memory controller and associated memory, an I/O interface and data interfaces to provide a scalable, cache-coherent, distributed shared memory system.

Referring to FIG. 1, an example processing device (referred to as a system 100) is illustrated in which a number of various units are operably coupled to one another through a bus. The various units of system 100 may be part of a single integrated circuit (IC) or the units may be embodied in separate ICs. In the particular embodiment of FIG. 1, the units shown may be constructed within a single IC so that the IC provides a complete system-on-a-chip solution that includes one or more processors, memory controller, network, input/output (I/O) interface and data interface to provide a scalable, cache-coherent, distributed shared memory system. Thus, bus 101 (also referred to as a ZB bus) in the particular example is an internal bus of an IC. The example system 100 is shown having four separate processors 102A-D. However, other embodiments of system 100 may operate with a single processor or any number of multiple processors. The example system 100 may operate in various applications including, packet processing, exception processing, switch control and management, higher layer of switching and filtering, application and computer servers, storage switches and systems, protocol conversion, and VPN (virtual private network) access, firewalls and gateways.

Other than the processors 102 (also noted as SB-1), system 100 includes a level 2 (L2) cache 103 to operate with a level 1 (L1) cache, which is present in individual processors 102. Processors 102 and cache 103 are operably coupled to the ZB bus. System 100 also includes a memory controller 104, switch 110, node controller 111, a packet manager 112, a bridge unit 115 and a system controller and debug (SCD) unit 119.

In the example system 100, processors 102 operate utilizing a particular instruction set architecture. Although the processors may be designed to operate utilizing the IA-32 or IA-64 instruction set architecture of Intel Corporation or the power PC instruction set, as well as others, processors 102 in the particular example comprise four low-power, superscaler 64-bit MIPS compatible processors with separate instruction and data caches. Processors 102 are coupled to the ZB bus 101, which in one embodiment is a high-performance, on-chip, cache-coherent internal bus. In one embodiment, the high-performance ZB bus operates as a 128 Gbps bus. The ZB bus is a cache-line wide (256 bits), split-transaction, cache-coherent bus which interconnects the various other units or modules shown in FIG. 1. In the particular embodiment, the ZB bus operates at half the processor core clock frequency for a bandwidth of 128 Gbps at 500 Megahertz. The bus has separate address, data, and control sections. The address and data sections are arbitrated separately to allow for a high bus utilization. The ZB bus supports a MESI protocol that helps maintain cache-coherency between the L1 caches, L2 cache and the I/O bridge, packet manager and node controller.

One or more of the SB-1 processors 102 may be a quad issue, in order execution, processor that implements the MIPS 64 architecture. The SB-1 core may include hardware support for floating-point processing and branch prediction. SB-1 memory subsystem may include a 32 KB, 4-way associative, virtually-indexed and virtually-tagged instruction cache in a 32 KB, 4-way set associative, physicallyindexed and physically-tagged data cache. In the particular embodiment, the cache line is 32 bytes wide. This provides the SB-1 processor with a large, fast, on-chip memory. A bus interface unit within processor 102 couples the memory subsystem to the ZB bus and L2 cache 103 for main memory access and maintains cache coherency along with the ZB bus.

The L2 cache, which is also coupled to the ZB bus, may be a 1 MB on-chip second level cache that may be shared by the four SB-1 processor. The L2 cache may also be shared by the node controller 111, packet manager 112 and any I/O DMA (direct memory access) master. In the particular embodiment, the L2 cache may be organized into 32-byte cache lines with 8-way set associativity. Accesses to the L2 cache may be in full cache blocks. The L2 cache may be a non-inclusive/non-exclusive cache, thus there are no restrictions on which cache blocks may be in the L2. A random replacement policy may be used when a victim line is to be found. The L2 cache may run internally at the CPU core speed and may be fully pipelined. The L2 cache may be physically one of the ZB bus agents, but architecturally the L2 cache sits between the system bus and the main memory and there may be dedicated signals between the L2 and memory controller 104. In an alternative embodiment, aside for the normal operation of the L2 cache, a mode may exist where banks of the L2 cache may be used as an on-chip SRAM (static random access memory).

Memory controller (MC) 104 is a controller that works closely with the L2 cache to provide a high-performance memory system. Although the number of channels may vary depending on the memory controller and the system employed, the particular MC 104 in the embodiment of FIG. 1 includes four data channels, illustrated as channels 0-3, in which a given data channel provides a 32-bit data path with 7-bit ECC (error correction code) for a total of 39 bits. MC 104 is typically coupled to a memory or memories, which may reside on the IC or may be located external to the IC chip. In the particular example shown in FIG. 1, MC 104 is coupled to an external memory 150 that operates as a main memory for the system 100.

A variety of memory devices may be controlled by MC 104, including synchronous dynamic random access memory (SDRAM) and double date rate (DDR) SDRAMS. Furthermore, pairs of channels may be ganged together to form up to two 64-bit channels with 8-bit ECC. In one embodiment, MC 104 may directly support up to eight standard, two-bank 184-pin DDR DIMMs (double inline memory modules) running at approximately 133 MHz and allows for performance to increase as the DIMMs support higher data rates. The peak memory bandwidth for a ganged 64-bit channel using standard (133 MHz clock) DIMMs may be 34 Gbps and may also increase up to 102 Gbps for a high-speed (400 MHz clock) design using all channels. A given 32-bit channel of MC 104 may support up to 512 MB of memory using 256-Mbit technology parts. As larger DRAMS become available the capacity may increase up to and beyond 1 GB with 512 Mbit parts and beyond 2 GB with 1 Gbit parts for a total of 8 GB across all four channels. Furthermore, special large memory mode may be utilized to increase the size of the memory further when MC 104 is used in conjunction with an external decoder.

The switch 110 may be utilized to switch and route data through either node controller (NC) 111 or packet manager (PM) 112. In the particular example system 100 of FIG. 1, three high-speed HT/SPI-4 ports (identified as Port0, Port1 and Port2) coupled to respective HT/SPI-4 interfaces 120A-C. Interfaces 120A-C transmit and/or receive HT and/or SPI data using HT and/or SPI-4 protocol. Switch 110 receives data from interfaces 120A-C and internally segments the received SPI packets and HT transactions for routing to either NC 111 or PM 112. Similarly, when transmitting data, switch 110 receives SPI packet data or HT transactions from either NC 111 or PM 112 and routes it to one of the interfaces 120A-C. Node controller 111 transfers HT and inter-node coherency traffic between switch 110 and the ZB bus. PM 112 transfers packets to and from switch 110 and the ZB bus. Generally, the packets are transferred to and from PM 112 and the memory controlled by MC 104.

Although a variety of circuitry may implement PM 112, the example embodiment shown in FIG. 1 utilizes a packet manager which may be a direct memory access (DMA) engine that writes packets received from switch 110 to input queues in the main memory and reads packets from the output queues to the correct interface 120. The particular PM 112 may be comprised of two subsections referred to as input packet manager (PMI) and output packet manager (PMO). Both the PMI and PMO have descriptor engines and caches. These engines may prefetch descriptors and data from main memory as the software releases new descriptors for PM 112 to work on. PM 112 may have support for 32 input and 32 output queue descriptor rings. These queues may be assigned to virtual channels of the HT/SPI-4 interfaces 120 under software control. Additionally, the PMO may also handle scheduling packet flows from two or more output queues that may be sent to the same output virtual channel. Additionally, the PM may have TCP (transmission control protocol) and IP (internet protocol) checksum support for both ingress and egress packets.

NC 110 may perform a number of basic functions. For NC 110 of system 100, NC 110 may perform functions that include acting as a bridge between the ZB bus and HT/SPI-4 interfaces 120. Accesses originated on either side may be translated and sent on to the other. Support for HT configuration may also be supported. The second function may be to implement the distributed shared memory model with a CC-NUMA (cache coherent non-uniform memory access) protocol. Through a remote line directory (RLD), lines may be coherently sent to remote nodes while they are tracked. When lines need to be reclaimed, probes may be issued to retrieve or invalidate them. NC 110 may be responsible for generating any coherent commands to other nodes to complete another operation. Ordering of events may also be taken care of in NC 110.

The HT/SPI-4 (hyper-transport/SPI-4) interfaces 120A-C may comprise ports that are configured as interfaces that allow the system to communicate with other chips using either HT and/or SPI-4 (including SPI-4 phase 2) as the link protocol. In one embodiment there may be two, bidirectional interfaces on the chip, of 16-bits wide and independently capable of acting as an 8/16-bit HT and/or a SPI-4 link. The choice of whether to use a particular interface may be made statically at reset or alternatively by other techniques. The HT protocol may be compliant with version 1.02 of the Hyper-Transport specification. In addition, support may be present or added for the efficient transport of channelized packet data. Packet data herein being referred to the SPI-4 like traffic, which is based on message passing rather than read/write commands. This may be achieved by encapsulating the message packets into HT write commands to special addresses.

Bridge (BR1) 115 interfaces the ZB bus to various system interfaces, including a generic bus. Some examples of interfaces to the BR1 are noted in FIG. 1. In one embodiment for system 100, BR1 includes an interface to a generic bus which may be used to attach the boot ROM (read only memory) and/or a variety of simple peripherals. An SM bus interface may be employed to provide two serial configuration interfaces. The interfaces may provide hardware assistance for simple read and write of slave devices with the system as the bus master. The interface may include one or more DUARTs (dual asynchronous receiver/transmitter) which are serial ports that may provide full-duplex interfaces to a variety of serial devices. A general purpose input/output (GPIO) interface may have a number of pins that are available for general use as inputs, outputs or interrupt inputs. A PCI (peripheral component interconnect) interface may also be present to provide a connection to various PCI peripherals and components.

The system controller and debug unit 119 may provide system level control, status and debugging features for the system 100. These functions may include: reset functions, including a full reset activity by an external reset pin; debug and monitoring functions including system performance counters, a ZB bus watcher of data transfers for I/O and memory controller or L2 cache ECC errors, a programmable trace cache which may conditionally trace ZB bus events and an address trap mechanism; communication and synchronous functions including gathering and distributing interrupts from the HT, PCI, DMA, and external I/O devices to the SB-1 processors; and timing functions for watch dog timeouts and general purpose timing. SCD unit 119 may also include Ethernet interfaces (including gigabit Ethernet interface), JTAG (joint test action group) interface and a data mover using a multi-channel DMA engine to offload data movement and limited CRC (cyclic redundancy check) functions from the processors.

It is to be noted that only three HT/SPI-4 interfaces or ports are shown in system 100 of FIG. 1. However, the actual number of such ports may vary depending on the system employed. Interface 120 may be a high-speed port for the system and may be configured as either a 16-bit HT or a SPI-4 (including SPI-4 phase 2) interface. A variety of techniques may be employed to allow interface 120 to be a port for HT and SPI-4 data transfer. When in the HT mode, interface 120 may serve as either host or targets of an HT chain. In this configuration, the Rx and Tx for the particular interface 120 may be paired together to form a bidirectional HT link. The HT interface may be 1.2 Gbps/wire which results in a bandwidth of approximately 9.2 Gbps per HT link. For SPI-4 mode, the Rx and Tx interfaces may be considered independent. The interface 120 may be minimally clocked at a frequency to support 10 Gbps packet transfer rate (for example 600-800 Mbps/bit depending upon burst size and the desired link rate). Because the SPI-4 interface may be independent they can be oriented in a unidirectional flow. Note that in this configuration the ports may still be considered independent with several packet streams and flow control per interface. Lastly, interfaces 120 may be programmed such that one or more operate as SPI-4 and others in the HT mode. Thus, it is to be noted that the interfaces 120 may be configured in a variety of modes and functions depending on the particular technique of data transfer desired.

Also shown with system 100 in FIG. 1 is a clock generation unit 130. Clock generation unit 130 may take a variety of forms. In the particular embodiment shown, a phase locked loop (PLL) 131 generates a base clock rate and a clock tree 132 is utilized to provide various multiples or fractions of the base clock frequency from PLL 131. The clock tree outputs are then provided to ZB bus and to other components of system 100. It is to be noted that in one embodiment the outputs from the clock tree are synchronous to the base clock frequency from PLL 131 but have different clock frequencies. Furthermore, as noted above the ZB bus operates at half the clock frequency as the processors SB-1. Generally, the various components of system 100 operate receiving a particular clock frequency. Therefore, the units operating within a particular clock frequency are referred to as having its own clock domain and are described as such in the disclosure below. Thus, one example system 100 is shown in order to show an implementation for practicing the invention. However, it is to be noted that various other systems and/or devices may be employed as other embodiments for implementing the present invention.

Figure 2:
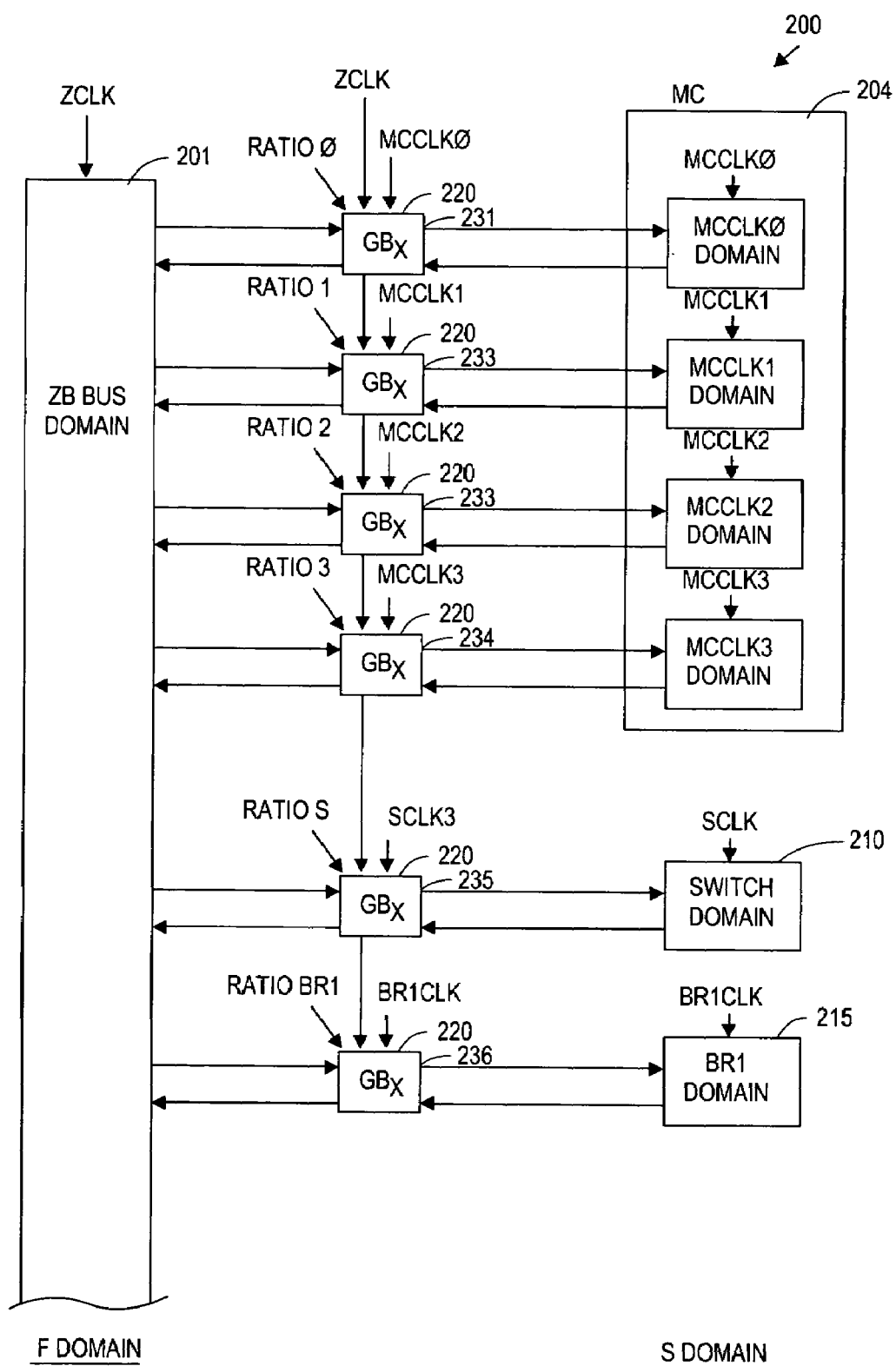
FIG. 2 is a block schematic diagram showing a use of a clock domain interface unit between domains having different clock frequencies.

Referring to FIG. 2, a number of clock domains are illustrated. The various clock domains relate to corresponding components of system 100 of FIG. 1. Accordingly, ZB bus domain 201 (ZCLK) corresponds to the clock domain of ZB bus 101 of FIG. 1. Likewise, switch domain 210 corresponds to switch 110, BR1 domain 215 corresponds to BR1 115, and MC domain 204 corresponds to the MC unit 104 of FIG. 1. Furthermore, in reference to the MC domain 204, since four memory channels 0-3 are exemplified in the MC unit 104 of FIG. 1, there may be four separate sub-clock domains to handle the data transfer individually. The four domains are noted as domains MCCLK0-MCCLK3 within memory controller clock domain 204. One or more of the clock signals from clock unit 130 may be operably coupled to the various domains shown in FIG. 2 to provide clock signals, such as ZCLK and MCCLK0-MCCLK3.

In reference to MC domain 204, the same or different clocks may be coupled to individual channels 0-1. In the example embodiment, the clocks to the four memory channels are shown as MCCLK0-MCCLK3. It is to be noted that some clock domains may have the same clock frequency, while others may have different clock frequencies. As noted above, the various clock domains may receive a clock signal from the clock tree 132 of base clock unit 130. The base clock rate may be at a high frequency rate, derived from PLL 131 of clock unit 130. Clock tree 132 divides the high base rate to obtain the frequency of the clock signal to individual clock domains shown in FIG. 2.

In one embodiment, the processors SB-1 operate at a frequency in which the base rate is divided by a fixed divisor of 2. The ZB bus domain operates at a frequency having a divisor fixed at 4 (one-half the CPU clock rate). MC domain 204 in one embodiment may be set having a divisor value from 4 to 32. Switch domain 210 may operate at a frequency having a divisor value from 4 to 15. Other components of FIG. 1 may operate having a divisor value from 4 to some integer number. In this particular embodiment, the various modules operate at a clock frequency which is equal to or slower than ZB bus clock domain 201. Accordingly, the data transfer from the ZB bus domain to one of the other domains will be a transfer of data between two domains having the same clock frequency or from a higher clock frequency to a lower clock frequency. Alternatively, data flow from, one of the domains 204, 210, 215 to the ZB bus domain entails data transfer between domains of equal clock frequency or from a slower clock frequency to a higher clock frequency. It is to be noted that in other embodiments, domains transferring data to the ZB bus may operate at a higher clock frequency than the ZB bus domain. However, for the example system 200 shown in FIG. 2, the data transfer to the ZB bus domain from the other clock domains are assumed to be either at the same clock frequency or from a slower clock domain to the higher ZB bus clock domain.

As was noted in the background section above, whenever data transfers occur between two domains of different clock rates, a mechanism may need to be implemented to ensure that proper timing adjustments are made to effect proper data transfer. Since the data flow from ZB bus domain 201 to one of the other domains is from a faster clock domain to a slower clock domain in the example, the data transfer rate may need to be adjusted in order that all the data transmitted from the faster clock domain are captured by the receiving slower clock domain. Likewise when data is being transmitted from one of the slower clock domains 204, 210, 215, some mechanism ensures that all of the valid data is received.

System 200 shown in FIG. 2 employs a mechanism of ignoring certain clock pulses in order to obtain one-to-one data transfer from the ZB bus domain to one of the other domains or from one of the other domains to the ZB bus domain. In the embodiment shown in FIG. 2, the mechanism for employing data transfer rate adjustment between two clock domains is obtained by utilizing a clock domain interface module 220. Interface module 220 is placed between two separate clock domains to adjust for the clock frequency difference between the two domains when data transfer is to be effected between the two domains. It is to be noted that interface module 220 may also allow data transfer between two domains having the same clock frequency, but the description below focuses on the two domains having different clock frequencies. Thus, in the example system 200, a clock domain interface module 220 is placed between ZB bus domain 201 and other clock domains 204, 210, 215. An interface module 220 may be placed between ZB bus domain 201 and other devices of FIG. 1, although not shown as such in FIG. 2.

It is to be noted that since separate domains may operate at a fixed clock frequency and since the clock frequency may be generated from the same clock source, a fixed ratio may be assigned between any two domains having fixed clock frequencies. Thus, in system 200, a ratio depicting the difference in the clock frequency between the ZB bus domain and one of the other domains may be calculated in which instance the lowest ratio would be one-to-one (1:1). A 1:1 ratio would be obtained if the particular domain operates at the same frequency as the ZB bus domain 201. This situation may arise when two separate clock signals are generated for the two domains, but have the same clock frequency. However, in instances where the other domains 204, 210, 215 operate at a slower clock frequency, a ratio of the ZB bus clock frequency to the clock frequency of one of the other domains has a ratio of greater than 1:1.

For the embodiment of FIG. 2, since the ZB bus clock frequency has a divisor fixed at 4 and the memory and switch operate at a frequency where the base clock is divided by a divisor of 4 to 32 or 4 to 15, the highest ratio with respect to the ZB bus domain is 15:4 for the switch domain 210 and 32:4 (8:1) for the memory domain. Since the ratio of the clock frequency between the ZB bus domain and the other domains is fixed, respective interface modules 220 may be set to adjust for this ratio. Furthermore, since separate interface modules are placed between the ZB bus domain and one of the other domains that couples to it, individual interface modules 220 may be set or programmed to compensate for the difference in the clock frequency to effect the data transfer. The compensation in individual interface module 220 adjusts the data transfer rate in both directions whether the data is moving from the faster domain to the slower domain or moving from the slower domain to the faster domain, since the ratio does not change for any given two clock domains.

As will be described below, in one embodiment interface module 220 is designed to have a programmable ratio setting capability so that the programming signals operably coupled to the individual interface modules may program a respective interface module 220 to respond to a particular ratio. Accordingly with this programmability, interface module 220 is also referred to as a "gear box" or GBx.

Figure 3:
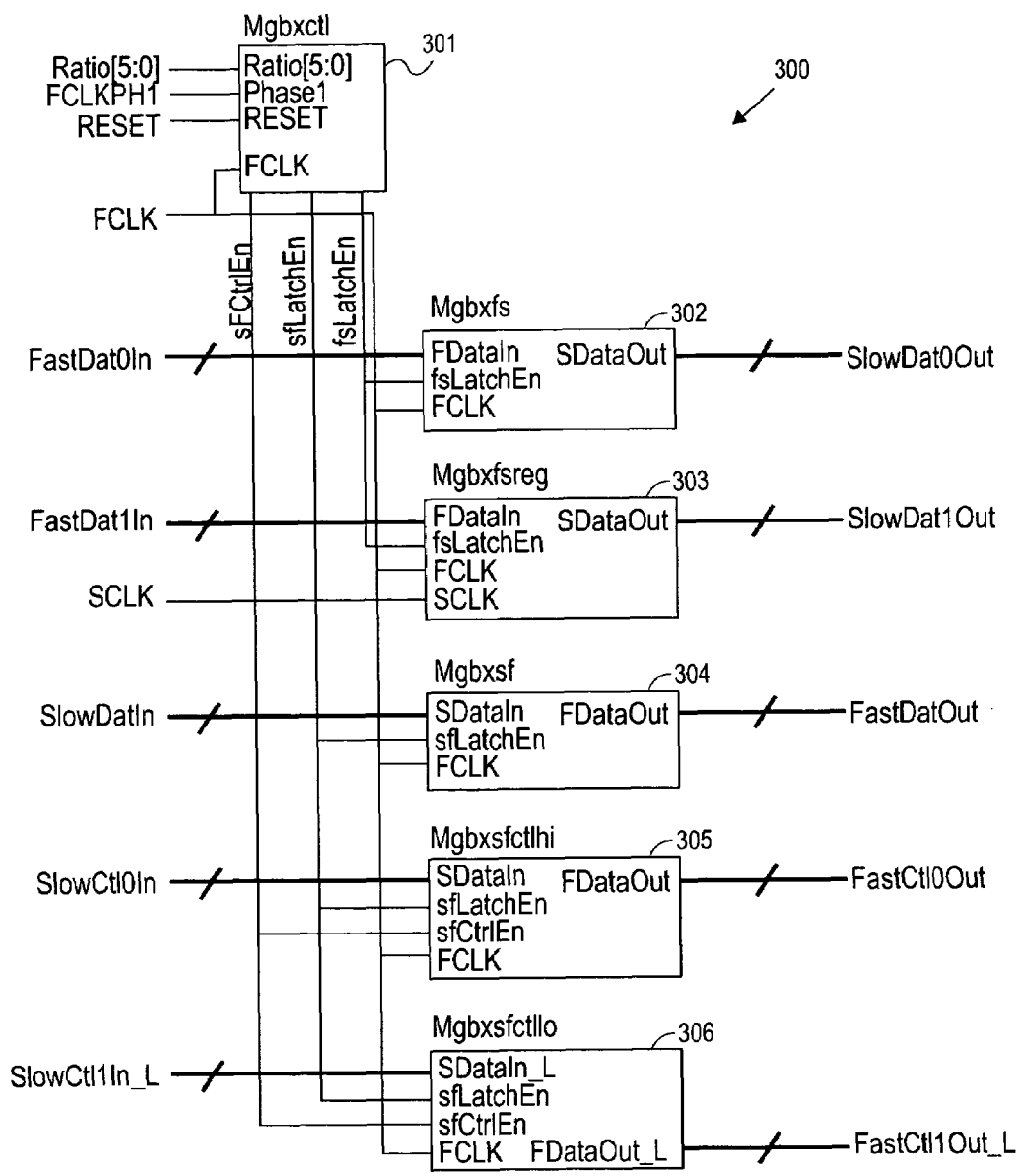
FIG. 3 is a block schematic diagram showing one embodiment for implementing the interface unit of FIG. 2.

Although a variety of different circuitry may be implemented for GBx unit 220, one example embodiment is illustrated in FIG. 3 with the signal (data or control) path shown in bold. The particular example of GBx 300 shown in FIG. 3 comprises a control circuit 301 (also noted as Mgbxctl) and one or more latching circuits 302, 303, 304, 305, 306 (also noted as Mgbxfs, Mgbxfsreg, Mgbxsf, Mgbxsfctlhi and Mgbxsfctllo). The nomenclature used to describe circuit 300 in FIG. 3 references either the fast or the slow domain operably coupled to the particular GBx. Accordingly, FCLK signifies the fast clock, which is the clock of the faster domain. SCLK references the slower clock signal from the slower domain.

Generally in reference to FIG. 2, the FCLK signal corresponds to the clock signal applied to the ZB bus domain while the SCLK signal pertains to the clock signal associated with the other domain coupled to the ZB bus domain through the GBx unit 220. Similarly, FastDat0In and FastDat1In signals pertain to the data input from the ZB bus domain 201. The SlowDat0Out and SlowDat1Out signals pertain to the data transferred to the slower domain after passing through the GBx unit. The SlowDatIn signal pertains to data transfer from the slower clock domain and FastDatOut pertains to the signal transferred to the faster clock domain. In the example circuit of GBx 300, control circuit 301 receives the faster clock FCLK from the faster domain and uses the FCLK clock signal to clock circuit 301. Control circuit 301 also receives the ratio information to set a particular ratio for the particular GBx, depending on the ratio of the clock frequencies between the faster domain and the slower domain. A reset signal may also be coupled to the control circuit 301 for resetting the unit. An FCLKPH1 signal is also coupled to the control unit 301 to trigger the start of a count cycle for a particular ratio chosen. As will be described below, the FCLKPH1 signal triggers the start of a ratio count whenever the FCLK and the SCLK signals are in synchronization.

Three control signals are output from control logic 301. These three signals are identified as sfCtrlEn (slow-to-fast control enable), sfLatchEn (slow-to-fast latch enable) and fsLatchEn (fast-to-slow latch enable). These control signals are coupled to certain one of the latches 302-306, as shown in FIG. 3.

As noted in the example embodiment of FIG. 3, latching circuit 302 (also referenced as Mgbxfs) is utilized to latch data from the faster domain and transfer the data to the slower domain. In one embodiment, latching circuit 302 uses a latch of arbitrary width to safely transmit data from the fast clock domain to the slower clock domain. A second latching circuit 303 (also designated as Mgbxfsreg) may also be used to latch in the data from the fast domain and output data to the slower domain. Latching circuit 303 performs the same function as latching circuit 302, but has a flip-flop at the output so that there is a delay of one clock edge when transferring data through the latching circuit 303. The SCLK signal is used to clock in the data into the output flip-flop of circuit 303. The two latching circuits 302 and 303 allow data to be transferred from the faster domain, such as the ZB bus domain, during the second portion of the clock signal of the faster time domain.

As noted in the circuit of GBx 300, the fast data in is split through two paths. A fundamental aspect of fast-to-slow conversion is that it requires a buffer running in the fast domain. This design allows the capture of valid data in the fast domain for later observation in the slow domain. It is to be noted that the dual path is a design choice and that other embodiments may employ a single data path for data transfer from the faster domain to the slower domain.

Latching circuit 304 (also labeled Mgbxsf) is a latch of arbitrary width used to safely transmit data from the slower clock domain to the faster clock domain. Thus, in the example, the latching circuit 304 is used to transfer data from one of the other domains to the faster ZB bus domain. Since streaming data from the slower domain to the faster domain is possible, a single data path is used.

Latching circuit 305 (also identified as Mgbxsfctlhi) is a specialized version of Mgbxsf and is used to transmit a correctly masked active-high control signal from the slower clock domain to the faster clock domain. Although the width may be arbitrary, in one embodiment, a single bit is used. Likewise, latching circuit 306 (also identified as Mgbxsfctllo) is also a version of Mgbxsf and is used to transmit a correctly masked active-low control signal from the slower clock domain to the faster clock domain. Again, arbitrary width may be employed, but in one embodiment, a single bit is used. These signals are used since the masking control is provided in the slower domain to identify the bits to be masked in the data transfer.

It is to be noted that control circuit 301 may operate in conjunction with any one or more latching circuits 302-306. Accordingly, if GBx 300 is employed in GBx unit 220 of FIG. 2, GBx unit 220 would include control circuit 301 and one or more latching circuits 302-306. In this approach of having all of the latching circuits present within a given GBx unit 220, each GBx unit 220 may handle any type of data or control signal transfer between the two different clock domains. In other embodiments, since individual GBx unit 220 may have a particular function, such as data flow in only one direction, a given GBx unit 220 may include only one or some of the latching circuits shown in FIG. 3. The number and type of latching circuits 302-306 to be implemented in a given GBx unit 220 may vary depending on a design choice and the system implemented.

As noted in the embodiment of FIG. 3, the FCLK clock is operably coupled to all the latching circuits 302-306. The SCLK signal is coupled only to the Mgbxfsreg unit 303 to latch data into the output flip-flop. The fast to slow latch enable fsLatchEn is operably coupled to the Mgbxfs and Mgbxfsreg latches 302, 303, which transfer data from the fast domain to the slow domain. The sfLatchEn signal is coupled to the three latches 304, 305, 306, which transfer data and control signals from the slower domain to the fast domain. Accordingly, Mgbxfs and Mgbxfsreg units latch in the fast data and transfer the data to the slower domain while Mgbxsf transfers data from the slower domain to the faster domain. Mgbxsfctlhi and Mgbxsfctllo units are used to latch the control signals used for masking. The sfCtrlEn signal is coupled to the latching circuits Mgbxsfctlhi and Mgbxsfctllo units.

In reference to FIG. 2, if circuit of GBx 300 is implemented within GBx unit 220, for example GBx unit 231, then data transfer from the ZB bus domain 201 to the MCCLK0 domain would utilize the Mgbxfs and Mgbxfsreg latches 302, 303. For data transfer from the MCCLK0 domain to the ZB bus domain, Mgbxsf latch would be utilized for the data transfer and control signal transfers would utilize Mgbxsfctlhi and Mgbxsfctllo latches. The other GBx units 232, 233, 234, 235, 236 may employ similar techniques in transferring data to and from the ZB bus domain and control signals to the ZB bus domain.

It is to be noted that a variety of techniques may be employed to adjust for the difference in the clocking frequency between the two domains. One technique is to ignore certain pulses of the faster clock so that there is one-to-one data alignment between the two different clock domains. Since all of the clock signals are generated from the same clock source 131, there is a point of synchronization between clocks of the faster domain and the slower domain. This point of synchronization of the two clocks may be used as the synchronization point to initiate a count within the GBx unit. The point of synchronization of the FCLK and SCLK triggers a state change of the FCLKPH1 signal which triggers a count of the FCLK pulses to align the two clock domains to effect the data transfer. The count from the point of synchronization depends on the particular ratio of the two clock domains. How this is achieved is shown in one example of a timing diagram for a ratio of 1.25:1 (5:4).

Figure 4:
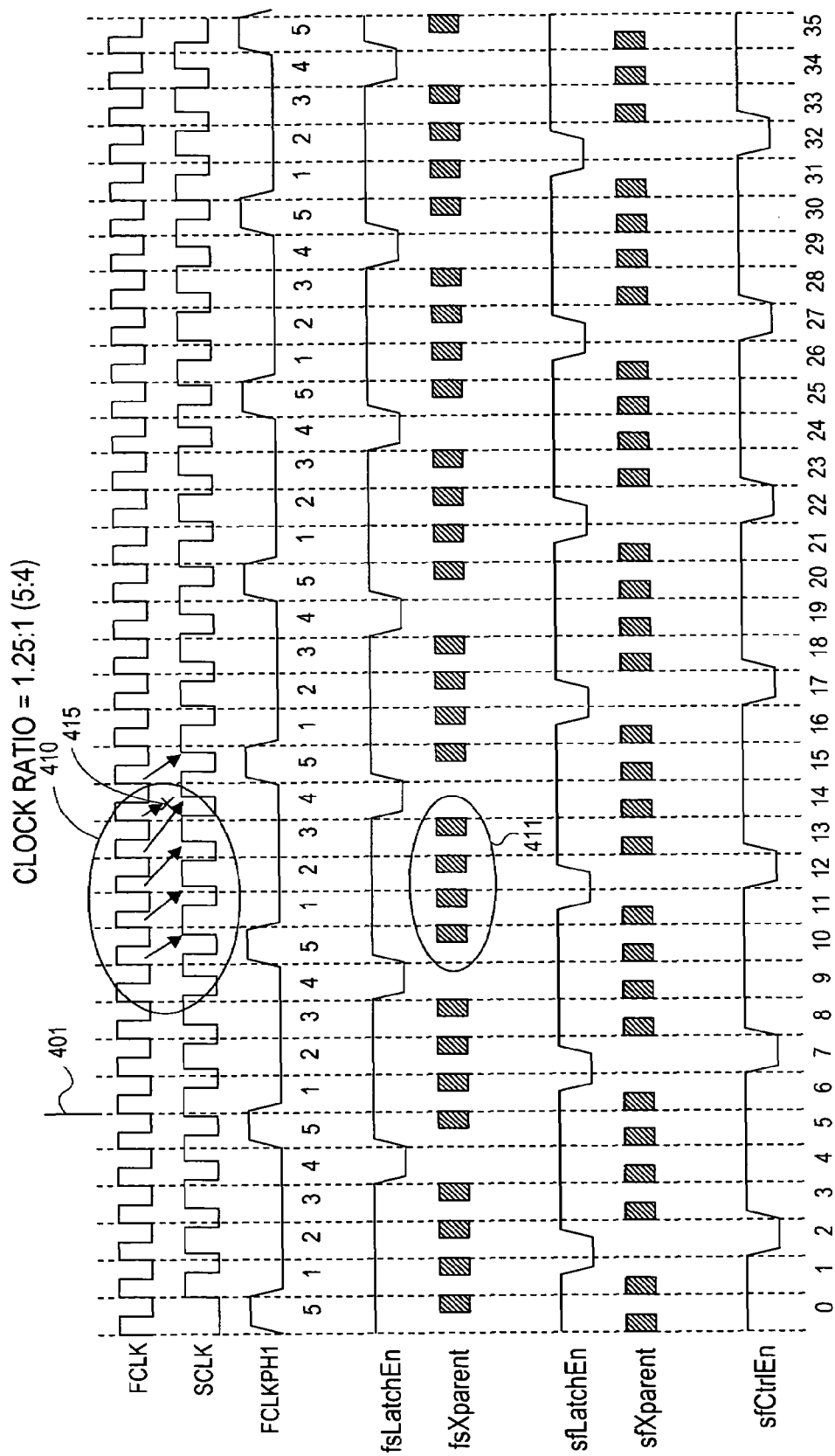
FIG. 4 is a timing diagram showing the state of various signals for data transfer between two domains having a clock ratio of 5:4.

FIG. 4 illustrates a timing diagram when GBx 300 is set to a ratio of 5 to 4 (5:4), which is 1.25:1. In FIG. 4, the signal FCLKPH1 goes low when the two clock signals FCLK and SCLK are in synchronization at time 401. Once the FCLKPH1 signal goes low, a count may be initiated based on the ratio X:4. In the example of FIG. 4, X takes a value of 5 so that a ratio of 5:4 (or 1.25:1) may be achieved. In the particular example, the second number of the ratio is always set at 4 in order to obtain a granularity of 0.25 (¼) for a given ratio chosen. Thus, in this instance the ratio 5:4 obtains a granularity of 0.25 by having the ratio 1.25:1.

Once the FCLKPH1 signal changes state at the point of synchronization 401, a count based on the first number of the ratio commences and increments with each FCLK pulse. Since the ratio is fixed, at the end of the count (5 in this instance), another point of synchronization occurs between the FCLK and SCLK signals. Since the ratio of the two clock domains is 5:4, there will be 4 slow clock pulses to every 5 fast clock pulses as shown in circled region 410. Accordingly, for data transfer to occur in either direction, one of the fast clock edges (shown as edge 415 in region 410) is not used, so that there is a one-to-one clock edge comparison between the fast and slow domains.

The fast-to-slow data transfer is controlled by the fsLatchEn signal so that whenever this signal is high, the data from the fast clock domain is made transparent for transfer to the slower clock domain. Shaded region 411 illustrates the four periods where the faster domain data may be made transparent for output to the slower clock domain. Thus, in FIG. 4 fsXparent (fast-to-slow transparent) indication shows when the fast data is made available for latching through to the slower domain. In reference to FIG. 3, the latching circuits Mgbxfs and Mgbxfsreg allows data to be made transparent from the fast clock domain to the slow clock domain.

Similarly, when the sfLatchEn signal is high then data from the slower clock domain may be made transparent to the faster clock domain as shown by the indication of sfXparent (slow-to-fast transparent) indication in FIG. 4. For transfer of control signals from the slow to the faster domain, sfCtrlEn signal may be used and as noted the sfCtrlEn signal lags the sfLatchen signal by one clock edge. Furthermore, in the particular example illustrated data from faster clock domain to the slower clock domain (fsXparent)

is made transparent in the second half of the FCLK period, while data from the slower clock domain to the faster clock domain (sfXparent) is made transparent in the first half of the FCLK period.

Accordingly, FIG. 4 illustrates at which counts data may be made transparent from the faster domain to the slower domain (fsXparent). Likewise, sfXparent illustrates when data from the slower clock domain may be made transparent to the faster clock domain. In both instances, 4 data transfers are made for each 5 clock pulses of the FCLK signal. Clock edge correspondence is shown by lines in region 410. Note that there is a 5 to 4 ratio in which one clock pulse 415 of the FCLK signal is not used for data transfer for every five count of the FCLK signal.

Figure 5:
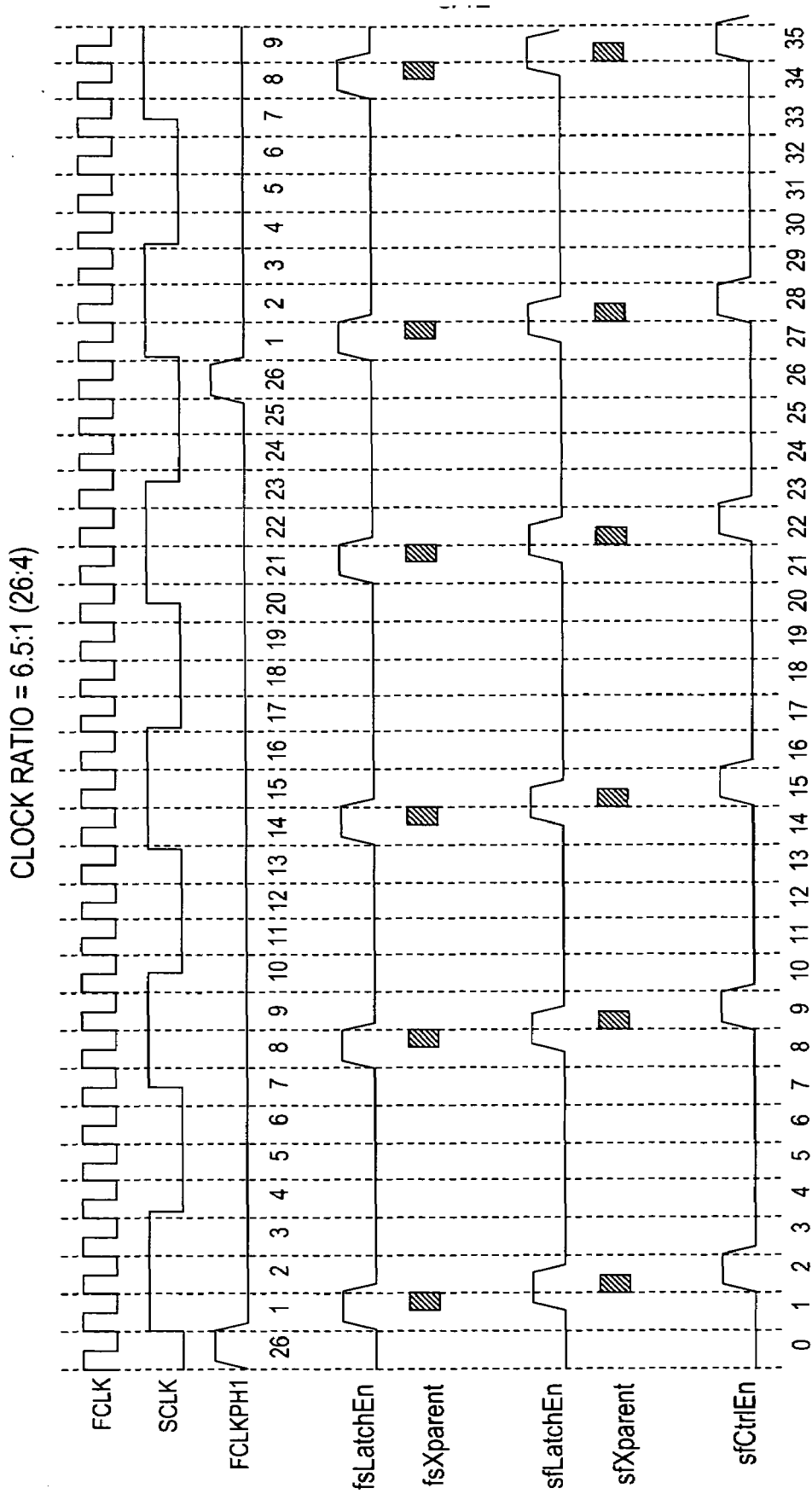
FIG. 5 is a timing diagram showing the state of various signals for data transfer between two domains having clock ratio of 26:4.

Another example ratio is illustrated in FIG. 5. Waveforms in FIG. 5 illustrate a situation in which the clock ratio is 26:4 (6.5:1). The ratio of 26 to 4 entail that once FCLKPH1 goes low at the synchronization of the FCLK and SCLK signals, 26 counts are taken. During the 26 counts, there are four transparent windows for transfer of data from the fast domain to the slow domain as illustrated by fsXparent and there are also four data transfers from the slow clock domain to the fast clock domain as illustrated by sfXparent. Accordingly, for every 26 FCLK pulses there are 4 SCLK pulses so that 22 of the FCLK pulses out of every 26 are not used for data transparency. The count pattern shown in FIG. 5 exemplify a 7-6-7-6 count, which is identified in the table of FIG. 9 and implemented by the state machine of FIG. 11.

It is to be noted that the actual number of ratios that are available depends on the granularity of the system desired and the extent of the maximum ratio chosen. As will be shown in the subsequent tables, in one embodiment, circuit 300 of FIG. 3 provides a ratio from 1.00:1 to 8.00:1 in granularity of 0.25.

Figure 6:
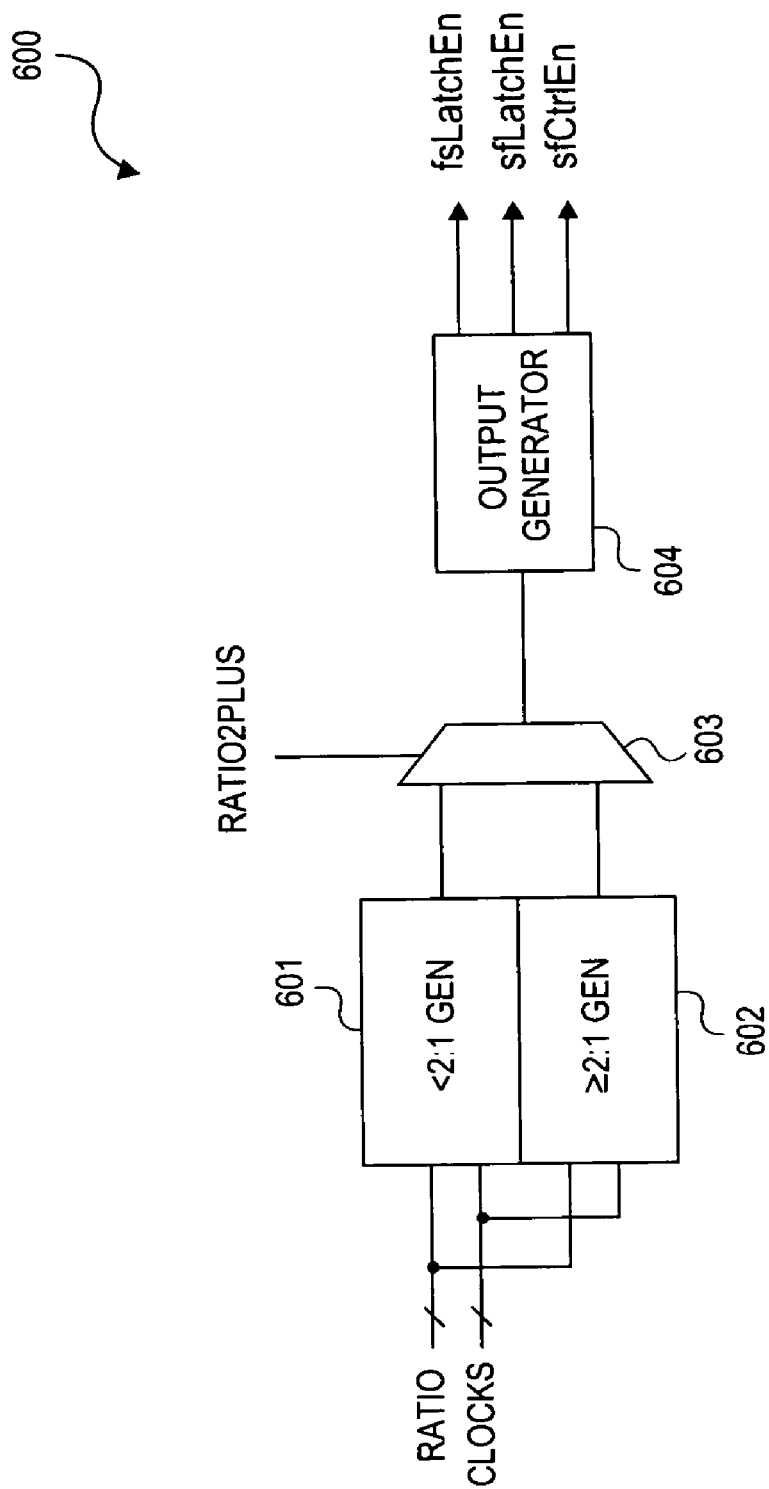
FIG. 6 is a block schematic diagram showing one embodiment for implementing the control circuit shown in FIG. 3.

Referring to FIG. 6, a block schematic diagram 600 illustrates one embodiment for implementing the controller unit 301 of FIG. 3. It is to be noted that various circuitry may be employed for the control circuit 301 and that schematic diagram 600 is but just one embodiment to implement control circuit 301. In the particular embodiment shown in FIG. 6, control circuit 600 includes less than 2-to-1 ratio generator (<2:1) 601 and an equal to or greater than 2-to-1 generator (≧2:1) ratio generator 602. The outputs from generators 601, 602 are fed to a multiplexer (MUX) 603. The output of MUX 603 is coupled to an output generator 604. Output generator 604 outputs the control signals fsLatchEn, sfLatchen, and sfCrtlEn. The ratio setting signal and the clocks (FCLK and FCLKPH1) are inputs to the two ratio generators 601, 602. It is to be noted that the ratio generator may be employed as a single unit or separate units. In the particular embodiment described, the particular state machine (FIG. 11) used for control signal generation utilizes an algorithm that works correctly only for ratios 2:1 or greater. The small number of ratios below 2:1 (namely, 1:1, 1.25:1, 1.5:1 and 1.75:1) may be handled with very similar logic, so that the control signal generator for these lower ratios have been merged together.

Figure 7:
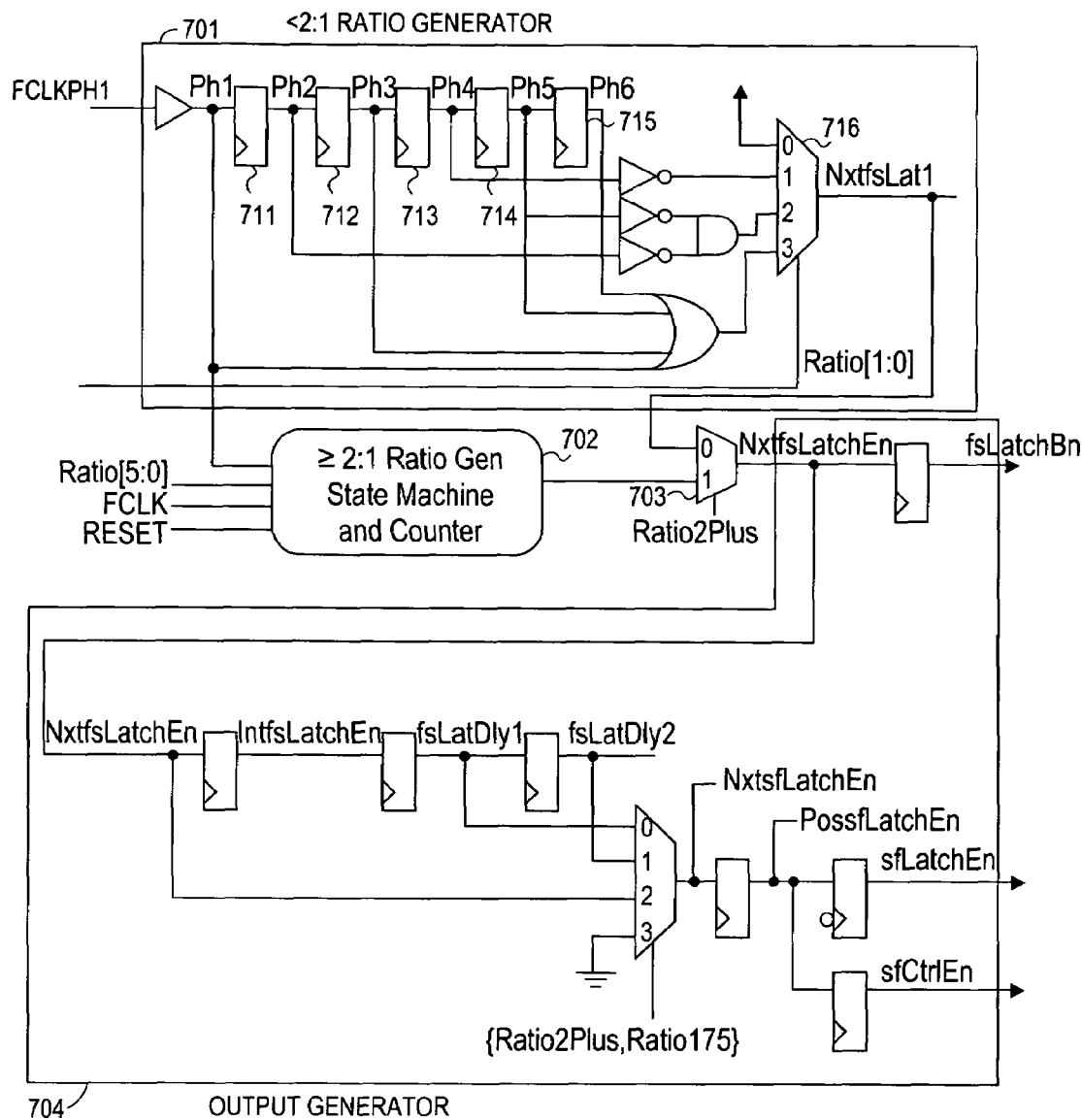
FIG. 7 is a circuit schematic diagram for implementing one example embodiment the circuit shown in FIG. 6.
Figure 12:
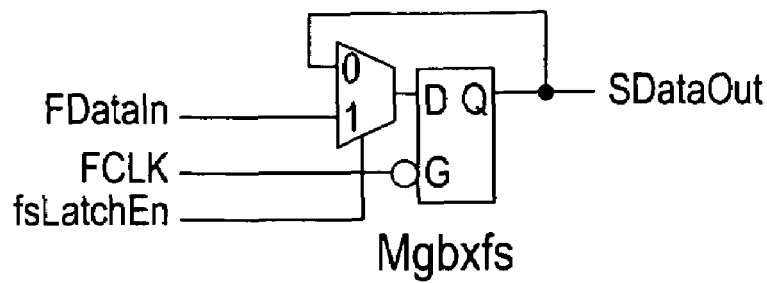
FIG. 12 shows one example embodiment for implementing the Mgbxfs latching circuit of FIG. 3.
Figure 13:
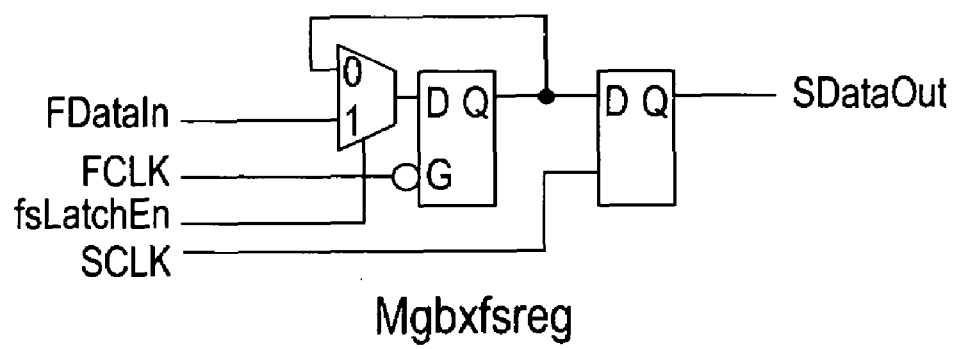
FIG. 13 shows one example embodiment for implementing the Mgbxfsreg latching circuit of FIG. 3.
Figure 14:
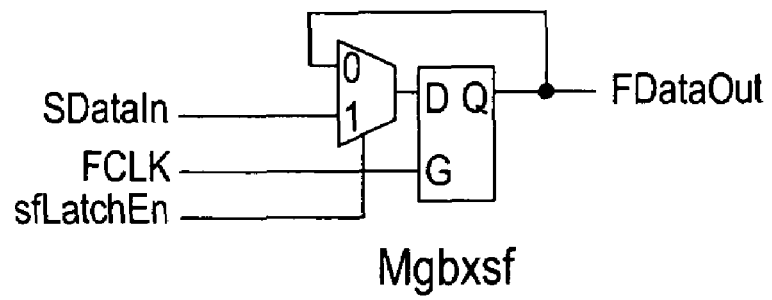
FIG. 14 shows one example embodiment for implementing the Mgbxsf latching circuit of FIG. 3.
Figure 15:
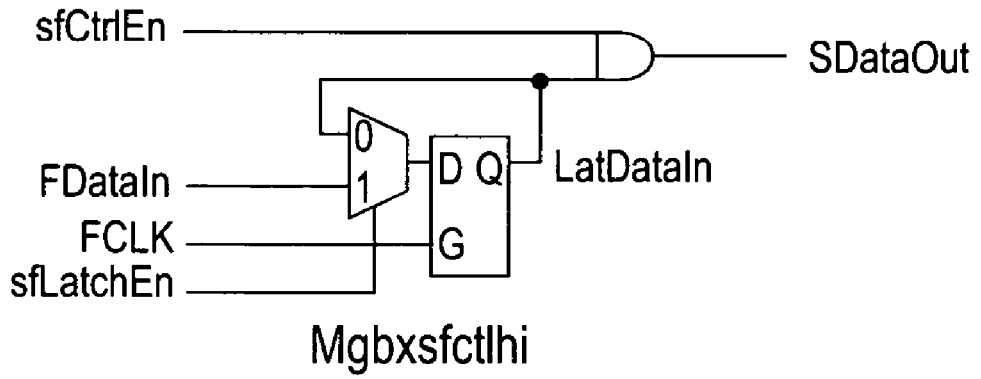
FIG. 15 shows one example embodiment for implementing the MgbxsfCtlhi latching circuit of FIG. 3.
Figure 16:
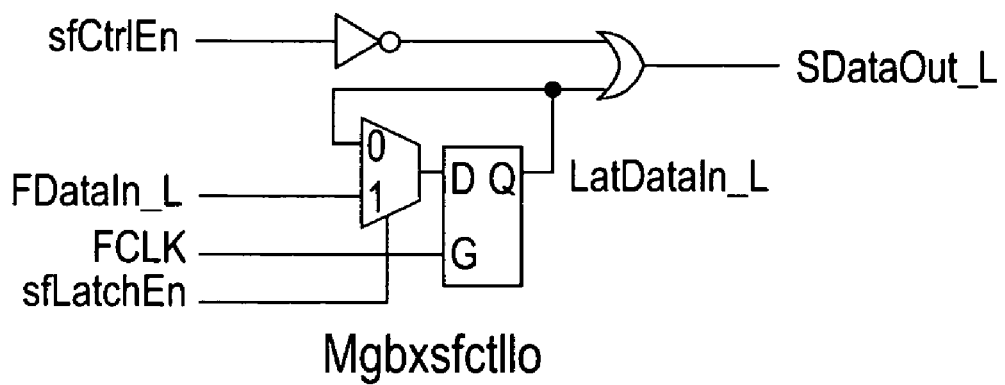
FIG. 16 shows one example embodiment for implementing the MgbxfsCtllo latching circuit of FIG. 3.

FIG. 7 illustrates a one circuit implementation for the various blocks shown in FIG. 6. The <2:1 ratio generator 701 may be comprised of a number of serially arranged registers (shown by latches 711, 712, 713, 714, 715) and the output of the registers are multiplexed by MUX 716. In the particular embodiment, six ratio setting bits (shown as Ratio [5:0]) may be used to set the particular ratio for the control unit. Two of the bits [1:0] may be used as the MUX 716 select signal to select one of four outputs, in which the output is noted as NxtfsLatl.

FIG. 8 shows which output may be selected as the output of MUX 716. The four selectable outputs from MUX 716 correspond to clock ratios of 1.00:1, 1.25:1, 1.50:1, and 1.75:1. As noted above, Ratio [1:0] of the Ratio [5:0] input determines which signal is output as NxtfsLat1. The Ratio bits correspond to the ratio of the clock frequencies of the two domains interfaced by the particular GBx unit.

The table of FIG. 8 may be interpreted as follows. When the ratio is 1.00:1, which is a ratio of 4:4, there is a 1-to-1 relationship between the FCLK domain and the SCLK domain so that fsLatchEn is always asserted for a 1-to-1 data transfer. When the clock ratio is 1.25:1 (5:4), there are 5 FCLK pulses for every 4 SCLK pulses. In that event, one of the FCLK phases is to be skipped for data transfer. Accordingly, the fsLatchEn is asserted in all FCLK phases except for phase 5. This ratio corresponds to the diagram illustrated in FIG. 4, where data transparency occurs four phases out of five of the FCLK clock pulses. For the 1.50:1 ratio (6:4) two FCLK clock phases out of six are not asserted. Accordingly, fsLatchEn is asserted in all FCLK phases except for phases 3 and 6. For the ratio of 1.75:1 (7:4), three of the seven FCLK clock phases are not be asserted. Thus, fsLatchEn is asserted in phases 2, 4, 6 and 7 and not asserted in phases 1, 3 and 5.

When the ratio between the two domains is equal to or greater than 2:1 (8:4 or greater) the embodiment described in FIG. 6 utilizes a different ratio generator. In the example embodiment of FIG. 7, a state machine and counter unit (collectively referred to as state machine 702) may be used for the ≧2:1 generator 602 of FIG. 6. FIG. 9 shows a table for implementing the logic for the state machine 702. The first column denotes the value assigned by the Ratio [5:0] bits, in which the number represented by a value of the Ratio [5:0] corresponds to the ratio N:4. For example, for entry 16 (N equals 16), the corresponding clock ratio is 16:4 (4.00:1). The behavior of the state machine 702 is for the various N values is listed in the last column of the table of FIG. 9.

As noted in the table of FIG. 9, fsLatchEn is asserted in a pattern which corresponds to the selected ratio value. Thus, for a clock ratio of 8:4 (2.00:1), the data may be made transparent every other phase of the FCLK signal. As illustrated in the diagram of FIG. 5, for a ratio of 26:4 (6.5:1) the fsLatchEn is asserted using a 7-6-7-6 counting pattern, for the range over the 26 counts. For FIG. 5, the data fsXparent or sfXparent is asserted initially at count 1 and the second assertion is made seven counts later at count 8. The third data transparency then occurs six counts later at count 14 followed by the fourth assertion occurring seven counts later at count 21. Six counts later at count 27 (which is phase 1 of the next count sequence of 1-26), the 7-6-7-6 pattern is repeated.

Thus, the data transparency pattern determined by fsLatchEn follows the pattern 7-6-7-6 for a complete count cycle of 26 FCLK pulses and is then repeated. Accordingly for the other ratios, the number of FCLK pulses forming a count cycle (which is determined by the first ratio number N) follows a data transparency rate determined by the patterns shown in FIG. 9. The sfLatchEn signal follows the pattern of the fsLatchEn signal with a lag of half a phase.

For the ratio of 32:4 (8.00:1), which is the last entry in the table of FIG. 9, the fsLatchEn is asserted in a 8-8-8-8 pattern signifying that data transparency occurs every eight phases of the FCLK signal over a cycle of 32 counts. It is to be noted that circuit 701 may maintain a granularity of 0.25 from a clock ratio of 1:1 to 8.00:1.

Figure 11:
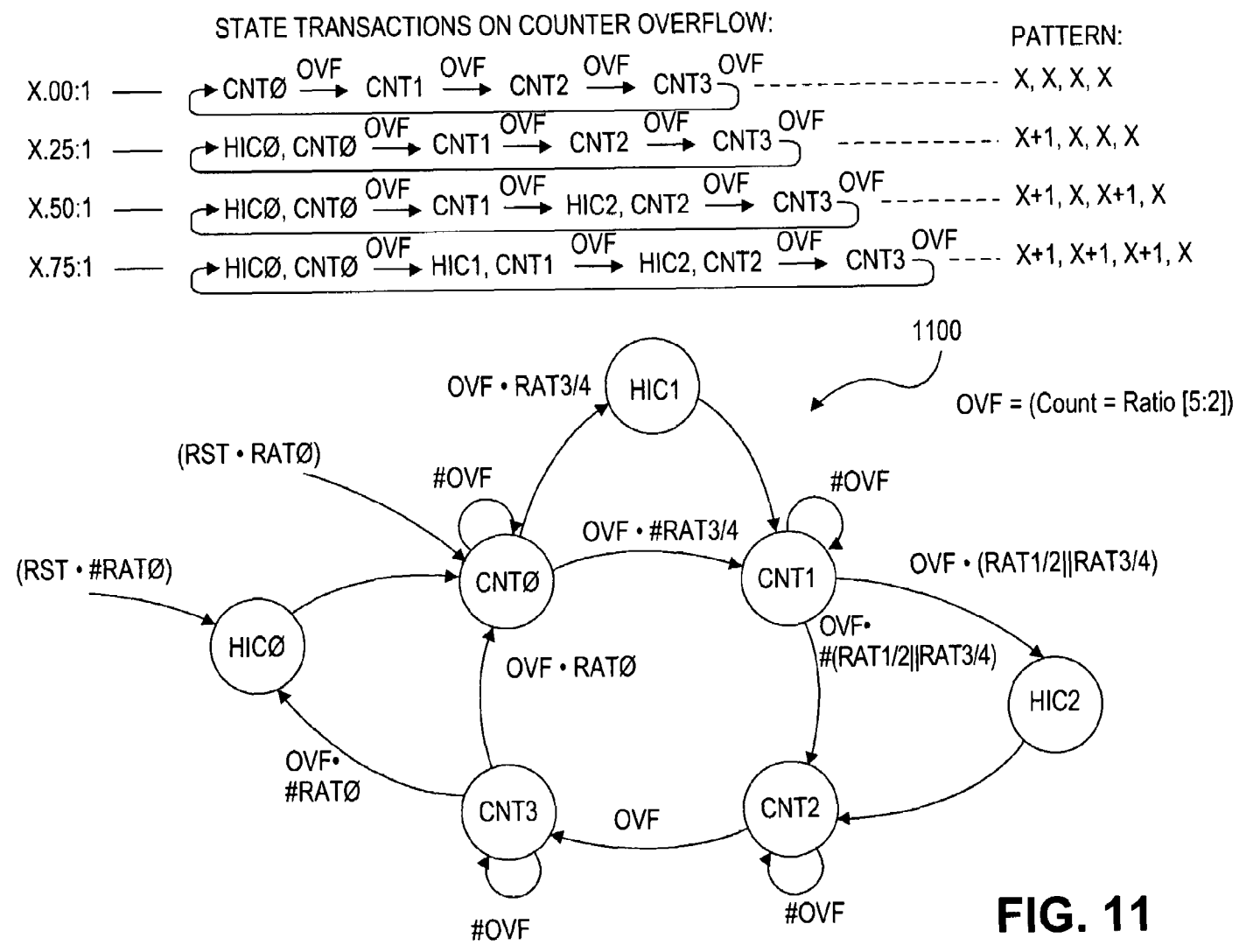

Although a variety of state machines may be implemented, one embodiment for implementing the state machine 702, with the behavior noted in FIG. 9, is shown in the state diagram 1100 of FIG. 11. The state machine uses the four count states CNT0, CNT1, CNT2 and CNT3, as its base counting loop to be used to count off the four transparent clocks in a repeating cycle. Interim (or "hiccup") states HIC0, HIC1 and HIC2 are used as a place holding state(s) when the pattern requires an added count or "hiccup." Once entering a count state CNT, a count proceeds until the integer value X set by the ratio is reached. Upon reaching the value X, an overflow (OVF) condition occurs in the counter and the machine transitions to either the next CNT state or a HIC state. How many HIC states are entered during a pattern sequence of the state machine is determined by the fractional portion of the ratio. FIG. 11 also identifies the state transitions on counter overflow and, as noted, the particular sequence is determined by the fractional portion of the ratio. The "#" sign in FIG. 11 (such as #OVF) denotes a "not" state (#OVF=not OVF).

For example, for a ratio of 13:4 (3.25:1) the fsLatchEn is asserted in a 4-3-3-3 pattern. The integer count for the pattern is three and the fractional portion is 0.25. Thus, count value X=3 and X.25:1 state transition sequence is used for state machine 1100. In this instance, state machine provides the 4-3-3-3 pattern by following X+1,X,X,X transitions (where X=3). The transitions are HIC0-CNT0-CNT1-CNT2-CNT3, where the overflow occurs after 3.

For the earlier described ratio of 26 (6.50:1) of FIG. 5, the integer value of X is 6 and the fractional portion is 0.50. Thus, each CNT state counts to 6 before overflowing. The state transition sequence is X+1, X, X+1, X, so the pattern is 7-6-7-6. The state machine transitions through the states HIC0-CNT0-CNT1-HIC2-CNT2-CNT3. It is to be noted that other patterns of FIG. 9 may be obtained by the use of state machine 1100.

FIG. 7 also shows the use of a MUX 703 to select between the output of the less than 2:1 ratio generator NxtfsLat1 or the output of the state machine 702 to generate the NxfsLatchEn signal. The NxfsLatchEn is coupled to an output generator 704. The NxtfsLatchEn is the D-input to a register that sources the fsLatchEn signal. NxfsLatchEn also generates the sfLatchEn signal based on the table provided in FIG. 10. The table in FIG. 10 illustrates the behavior for the generation of sfLatchEn. As noted, sfLatchEn is essentially the fsLatchEn signal but delayed by a particular number of phases of the FCLK signal for the various clock ratios. The 4-to-1 MUX in the output generator 704 selects the variable pipeline delay which is summarized in the table of FIG. 10. The signal sfCtrlEn is generated simply by the delay of one-half FCLK phase for following sfLatchEn.

GBx 300 of FIG. 3 had illustrated a number of latching circuits 302, 303, 304, 305, and 306. Although a variety of latching circuits may be employed for the respective latching circuits 302-306, FIGS. 12-16 illustrate one embodiment for implementing latching circuits Mgbxfs (shown in FIG. 12), Mgbxfsreg (shown in FIG. 13), Mgbxsf (shown in FIG. 14), Mgbxsfctlhi (shown in FIG. 15), and Mgbxsfctllo (shown in FIG. 16).

The latches in Mgbxfs and Mgbxfsreg are transparent whenever FCLK is zero. When the fsLatchEn control signal is 1 the data may pass through in the second half of the fast clock. Mgbxfs and Mgbxfsreg are employed for transfer of data from the fast domain to the slow domain (fast-to-slow data latch).

The latch in Mgbxsf, which is used for slow-to-fast data transfer, may be transparent whenever FCLK is 1. When the sfLatchEn control signal is 1, the data will pass through in the first half of the fast clock signal FCLK.

Slow-to-fast control latches Mgbxsfctlhi and Mgbxsfctllo may be transparent whenever FCLK is 1. When the sfLatchEn control signal is 1 the data may pass through in the first half of the fast clock FCLK. In addition, the active latch value (1 for Mgbxsfctlhi or 0 for Mgbxsfctllo) may only pass through to the output if the sfCtrlEn is 1.

There is 1-to-1 correspondence between sfLatchEn and sfCtrlEn assertions. This allows logic in the slow domain to continuously stream data to the fast domain and the Mgbxsfctlhi or Mgbxsfctllo blocks may insert bubbles in a data valid signal at appropriate times to reconcile the difference between the two clock periods.

Thus, a scheme to interface two clock domains is described. Generally, the various clock signals are sourced from the same clock source, but the embodiments of the invention are not limited to having the same clock source. Furthermore, the ratios to be selected for each interface (gearbox) may be set or made programmable. By utilizing the gearbox interface, flexibility and simplicity in design may be obtained to have odd clock ratios and/or finer granularity.

I claim:

1. An apparatus comprising:
    a first clock domain to operate at a first clock frequency;
    a second clock domain to operate at a second clock frequency; and
    an interface disposed between the first and second clock domains to control timing of data transfer from one of the first or second clock domains to other of the first or second clock domains, the interface including a ratio generator circuit coupled to receive a ratio setting signal to programmably select a frequency ratio, which is not an integer ratio, based on the first and second clock frequencies and to generate timing signals to control timing of the data transfer.

2. The apparatus of claim 1, wherein the interface is to allow for a granularity of 0.25 in the selected frequency ratio between the first and second clock domains.

3. The apparatus of claim 1, wherein the first clock domain is a bus domain and the second domain is a circuit operably coupled to the bus domain.

4. The apparatus of claim 1, wherein the interface to allow for data transfer in both directions in which first domain operates at a faster frequency than the second domain.

5. The apparatus of claim 1, wherein the interface includes at least one latching circuit to latch data through the interface from one clock domain to the other clock domain.

6. The apparatus of claim 5 further including a plurality of latching circuits, in which separate latching circuits are to be used to transfer data in a particular direction between the first and second clock domains.

7. The apparatus of claim 6, wherein the ratio generator circuit of the interface further includes a first and second ratio generators in which the first ratio generator is to be used to generate control signals to the latching circuits, if a ratio difference is below a ratio of 2:1 and the second ratio generator is to be used to generate control signals to the latching circuits if the ratio difference is equal to or above the 2:1 ratio.

8. An integrated circuit comprising:
    a first clock domain to operate at a first clock frequency;
    a second clock domain to operate at a second clock frequency; and
    an interface disposed between the first and second clock domains to control timing of data transfer in both directions between the first clock domain and the second clock domain, the interface including a ratio generator circuit coupled to receive a ratio setting signal to programmably select a frequency ratio, which is not an integer ratio, based on the first and second clock freciuencies and to generate timing signals to control timing of the data transfer.

9. The integrated circuit of claim 8, wherein the first domain is a bus domain and the second domain is operably coupled to the bus domain to transfer data to and from the bus domain.

10. The integrated circuit of claim 9, wherein the first and second domains are synchronized from a same clock source, but in which the first domain operates at a faster clock frequency than the second domain.

11. The integrated circuit of claim 10, wherein the ratio generator circuit is to select a frequency ratio of N:4, where N is an integer, to have a granularity 0.25 for the selected frequency ratio between the first and second clock domains.

12. The integrated circuit of claim 10, further including a plurality of additional clock domains operably coupled to the bus domain and in which a separate interface is disposed between the bus domain and the additional domains.

13. The integrated circuit of claim 12, wherein individual interfaces each includes at least one latching circuit to latch data through the interface between the bus domain and respective domain operably coupled to the bus domain.

14. A method comprising:
generating a first clock signal having a first frequency to a first clock domain;
generating a second clock signal having a second clock frequency to a second clock domain, a ratio between the first clock frequency to the second clock frequency being a non-integer ratio;
selecting programmably in a ratio generator the ratio between the two clock frequencies based on a ratio setting signal;
generating timing signals from the ratio generator based on the programmed ratio;
using the timing signals in an interface disposed between the first and second clock domains to control timing of data transfer from the first clock domain to the second clock domain.

15. The method of claim 14, wherein the first domain is a bus domain and the second domain is operably coupled to the bus domain in transferring data to and from the bus domain, the bus domain operating at a faster clock frequency.

16. The method of claim 15, wherein the ration between the first and second clock frequencies is a frequency ratio of N:4, where N is an integer, in order to have a granularity 0.25 for the frequency ratio between the first and second clock domains.

17. The method of claim 15, further including using a plurality of additional clock domains operably coupled to the bus domain and in which a separate interface is used between the bus domain and the additional domains, each respective interface generating respective timing signals based on respective programmed ratios between the bus domain and the additional domains.

18. The method of claim 15, further including latching data from the bus domain to the second domain by counting a difference in the clock pulses based on the selected ratio and skipping certain ones of excess clock pulses to have a one-to-one data transfer timing between the two clock domains.

19. The method of claim 15, further including latching data from the bus domain to the second domain by counting a difference in the edges based on the selected ratio and skipping certain ones of excess clock edges to have a one-to-one data transfer timing between the two clock domains.

* * * * *

UNITED STATES PATENT AND TRADEMARK OFFICE
CERTIFICATE OF CORRECTION

PATENT NO. : 7,296,174 B2  Page 1 of 1
APPLICATION NO. : 10/822534
DATED : November 13, 2007
INVENTOR(S) : James Kelly It is certified that error appears in the above-identified patent and that said Letters Patent is hereby corrected as shown below:

Column 17, line 4, in Claim 8: replace "freciuencies" with --frequencies--

Signed and Sealed this

Sixth Day of January, 2009

JON W. DUDAS
*Director of the United States Patent and Trademark Office*